US007788910B2

(12) United States Patent  (10) Patent No.: US 7,788,910 B2
McCabe et al.  (45) Date of Patent: Sep. 7, 2010

(54) PARTICULATE FILTER REGENERATION AND NOX CATALYST RE-ACTIVATION

(75) Inventors: Robert Walter McCabe, Novi, MI (US); Lifeng Xu, Farmington Hills, MI (US); John William Hoard, South Lyon, MI (US); Karen Marie Adams, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 790 days.

(21) Appl. No.: 11/746,357

(22) Filed: May 9, 2007

(65) Prior Publication Data

US 2008/0276602 A1  Nov. 13, 2008

(51) Int. Cl.
*F02B 27/04* (2006.01)
*F01N 3/00* (2006.01)
*F01N 3/10* (2006.01)

(52) U.S. Cl. .............................. 60/295; 60/273; 60/284; 60/285; 60/297; 60/301

(58) Field of Classification Search ................... 60/273, 60/284, 285, 295, 297, 301
See application file for complete search history.

(56) References Cited

U.S. PATENT DOCUMENTS 6,988,361 B2  1/2006  van Nieuwstadt et al.
7,040,086 B2  5/2006  Kitahara et al.
2004/0123590 A1  7/2004  Tabata et al.
2006/0070373 A1*  4/2006  Huang et al. ................. 60/286
2006/0179821 A1  8/2006  Zhan et al.
2007/0271902 A1*  11/2007  Noirot et al. ................. 60/273

FOREIGN PATENT DOCUMENTS

EP  1174600  1/2002
EP  1533490  5/2005
EP  1637717  3/2006
EP  1873365  1/2008

OTHER PUBLICATIONS

International Patent Office of United Kingdom, Search Report of GB 0807917.0, Aug. 28, 2008, IPO United Kingdom, 1 page.

* cited by examiner

*Primary Examiner*—Thomas E Denion
*Assistant Examiner*—Audrey Klasterka
(74) *Attorney, Agent, or Firm*—Julia Voutyras; Alleman Hall McCoy Russell & Tuttle LLP

(57) ABSTRACT

A system and method may be provided for operating a system having an engine with an emission control system, the emission control system including a lean NOx trap and a particulate filter, where after lean exhaust gas air-fuel ratio regeneration of the particulate filter at an elevated regeneration temperature, a rich or intermittently rich exhaust air-fuel ratio is provided for a duration lasting until LNT temperature falls to a minimum threshold, where said rich or intermittently rich operation reactivates catalysts in the LNT and reverses deactivation caused by the elevated temperature lean operation associated with previous particulate filter regeneration.

20 Claims, 5 Drawing Sheets

PARTICULATE FILTER REGENERATION AND NOX CATALYST RE-ACTIVATION

FIELD

This present application relates to an emission control system of an internal combustion engine, and in particular those combining particulate filtering systems with lean NOx traps.

BACKGROUND AND SUMMARY

Engine systems may use a diesel particulate filter (DPF) to reduce particulate emissions. In the case of an active DPF, deliberate changes to vehicle operation may be used to regenerate the filter, and may be triggered when the particulate matter builds up to levels where pressure drop across the filter exceeds a specified level. Active regeneration of a loaded DPF can take several tens of minutes and may require that the exhaust gas supplied to the DPF has a considerable excess of oxygen (over reductants) to ensure sufficient oxygen to sustain combustion of the particulate matter. Engine systems may also include lean NOx traps (LNT) used to control NOx emissions. Lean NOx traps may also variously be referred to as NOx storage-reduction catalysts, or simply NOx catalysts.

One approach for particulate filter regeneration in a system also having a NOx catalyst is described in 2004/0123590. In this approach, during DPF regeneration, the air-fuel ratio is periodically made rich to reduce sulfur poisoning of the NOx catalyst.

However, the inventors herein have recognized a potential disadvantage with such an approach. In particular, catalyst deactivation of the NOx catalyst may occur during the high temperature lean operation of DPF regeneration. Further, the rich operation for sulfur reduction occurring during the high temperature DPF regeneration may not last for sufficient duration (or may not be rich enough) to reactivate the NOx catalyst. Moreover, the periodic rich operation may be terminated during the lean portion of the cycle, thus leaving the NOx catalyst in the deactivated state. Thus, NOx performance may degrade even though the sulfur has been removed, as the NOx catalyst may be made substantially inactive due to high temperature lean operation, separate and apart from, sulfur accumulation.

In one approach, the above issues may be at least partially addressed by, after lean DPF regeneration, providing a rich or intermittently rich exhaust air-fuel ratio for a duration lasting until NOx catalyst temperature falls to a minimum threshold. Such operation may be used to reactivate NOx catalysts and reverse the deactivation that may have occurred from the high temperature lean operation associated with the previous DPF regeneration. In one particular example, such operation may be provided in response to an engine shut-down during DPF regeneration, thereby enabling improved performance on subsequent engine starts.

DETAILED DESCRIPTION

As described in further detail herein, there may be various issues encountered when concluding, or exiting, a DPF regeneration process. One strategy to address at least some of these issues switches the exhaust gas composition from primarily lean (which was used during the DPF regeneration to provide excess oxygen to support the particulate removal) to primarily rich to thereby expose other emission control devices, such as a LNT, to rich exhaust gases for a brief duration while still at high temperatures. Such operation may enable the restoration of catalytic materials in the LNT (for example, platinum (Pt) and rhodium (Rh)) to a reduced state with enhanced NOx control capability. This approach is generally in contrast to previous approaches in which DPF regeneration is terminated under high-temperature predominantly lean conditions, and such lean conditions are continued which may leave the LNT catalyst in a relatively inactive state. However, various additional features may further be used to effectuate the reactivation of the LNT, such as providing an appropriate richness level, and duration, in coordination with the temperature cool-down of the LNT. For example, the primarily rich exhaust air-fuel ratio (used upon exiting DPF regeneration) may be continued until LNT temperature falls below a threshold value, thereby providing sufficient reactivation and reducing the potential catalyst inactivation generated by higher temperature and lean conditions.

Figure 1:
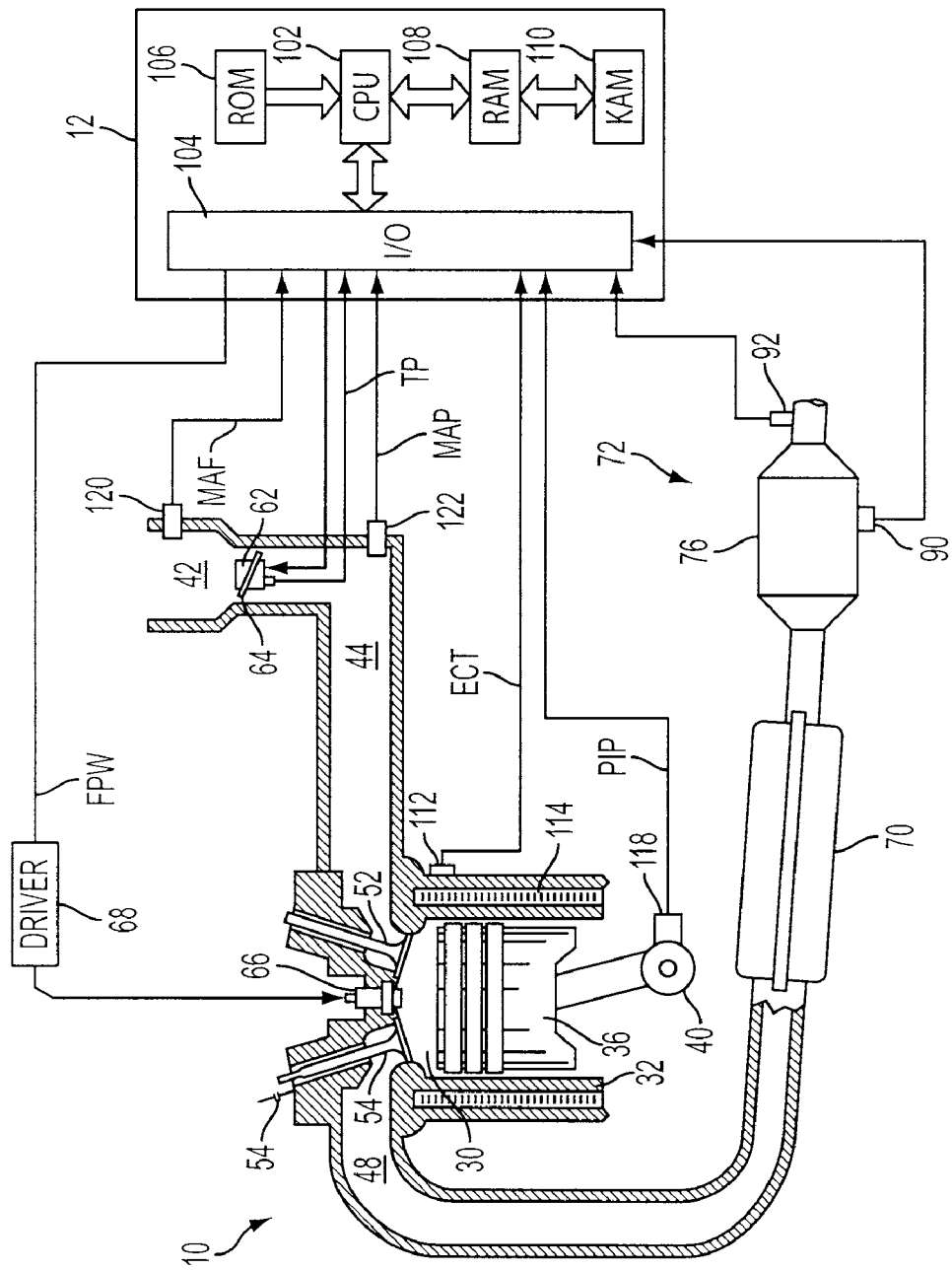
FIG. 1 shows an example engine system.

Various examples of the approaches described herein may be understood with respect to an example engine and exhaust system, such as that described in FIG. 1. Specifically, FIG. 1 shows an example internal combustion engine 10 comprising a plurality of combustion chambers, only one of which is shown. The engine 10 may be controlled by electronic engine controller 12. In one example, engine 10 may be a common rail direct injection diesel engine.

Combustion chamber 30 of engine 10 includes combustion chamber walls 32 with piston 36 positioned therein and connected to crankshaft 40. Combustion chamber 30 is shown communicating with intake manifold 44 and exhaust manifold 48 via intake valve 52, and exhaust valve 54. While this example shows a single intake and exhaust valve, one or more cylinders may include a plurality of intake and/or exhaust valves.

Fuel injector 66 is shown directly coupled to combustion chamber 30 for delivering liquid fuel directly therein in proportion to the pulse width of signal fpw received from controller 12 via electronic driver 68. Fuel may be delivered by a fuel system (not shown) including a fuel tank, fuel pumps, and a common fuel rail (not shown). In some embodiments, engine 10 may include a plurality of combustion chambers each having a plurality of intake and/or exhaust valves.

Intake manifold 44 may include an throttle body 42 and may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may also include a mass air flow sensor 120 and a manifold air pressure sensor 122 for providing respective signals MAF and MAP to controller 12.

Catalytic converter 70 is shown in communication with exhaust manifold 48. In some embodiments, catalytic converter 70 may be a lean NOx trap (LNT) which may include various precious metals, such as platinum (Pt) and rhodium (Rh). An emission control system 72 is shown downstream of catalytic converter 70. Emission control system 72 may include emission control device 76, which in one example may be a diesel particulate filter (DPF). The DPF may operate actively or passively, and the filtering medium can be of various types of material and geometric construction. One example construction includes a wall-flow ceramic monolith comprising alternating channels that are plugged at opposite ends, thus forcing the exhaust flow through the common wall of the adjacent channels whereupon the particulate matter is deposited.

While this example shows the LNT upstream of a DPF, the DPF may also be positioned upstream of the LNT.

In one example, the NOx trap 70 may be positioned between a diesel oxidation catalyst (DOC, not shown) and the DPF 72 and may be used to store NOx under most operating conditions and convert the stored NOx to dinitrogen (N2) during occasional induced rich air-fuel (A/F) excursions. The NOx trap and DPF can also be combined in one converter assembly, if desired. NOx trap 70 may contain a material for storing the NOx (such as an alkali or alkaline earth oxide), platinum group metals (such as platinum and rhodium) for promoting both NOx storage and release, a support material (such as alumina), and optionally rare earth oxides (such as ceria) which are known as oxygen storage materials but often used to improve dispersion of the platinum group metals. Of the two metals—Pt and Rh—Rh is the less noble; it oxidizes more readily than Pt and interacts more strongly with supporting phases such as alumina. In addition, both Pt and Rh are thought to oxidize more readily when in the presence of ceria. Although the LNT and DPF are normally viewed as separate entities, it is possible to combine the two on one substrate, e.g., a wall-flow ceramic DPF element coated with NOx storage agents and platinum group metals.

To provide more accurate control of engine operation and/or exhaust air-fuel ratio, one or more exhaust sensors may be used in the exhaust system, such as indicated at 90. Further, various additional exhaust sensors may also be used in emission control system 72, such as various NOx sensors, ammonia sensors, etc., denoted at 92.

System 72 may also include a reductant injector, such as a fuel injector, located in the engine exhaust (not shown). Further, the system may include a reformer to process fuel into $H_2$, CO, cracked and partially oxidized HCs for injection into the exhaust thereby enabling improved reduction performance. Still other methods of reductant delivery to the exhaust, such as rich combustion, may also be used.

Controller 12 is shown in FIG. 1 as a microcomputer including: microprocessor unit 102, input/output ports 104, an electronic storage medium of executing programs and calibration values, shown as read-only memory (ROM) chip 106 in this particular example, random access memory (RAM) 108, keep alive memory (KAM) 110, and a data bus (I/O). Controller 12 may include code stored on computer readable medium that can be executed by the controller. Controller 12 is also shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122.

Combustion in engine 10 can be of various types, depending on operating conditions. While FIG. 1 depicts a compression ignition engine, it will be appreciated that the embodiments described herein may be used in any suitable engine, including but not limited to, diesel and gasoline compression ignition engines, spark ignition engines, direct or port injection engines, etc. Further, various fuels and/or fuel mixtures such as diesel, bio-diesel, etc, may be used.

Figure 2:
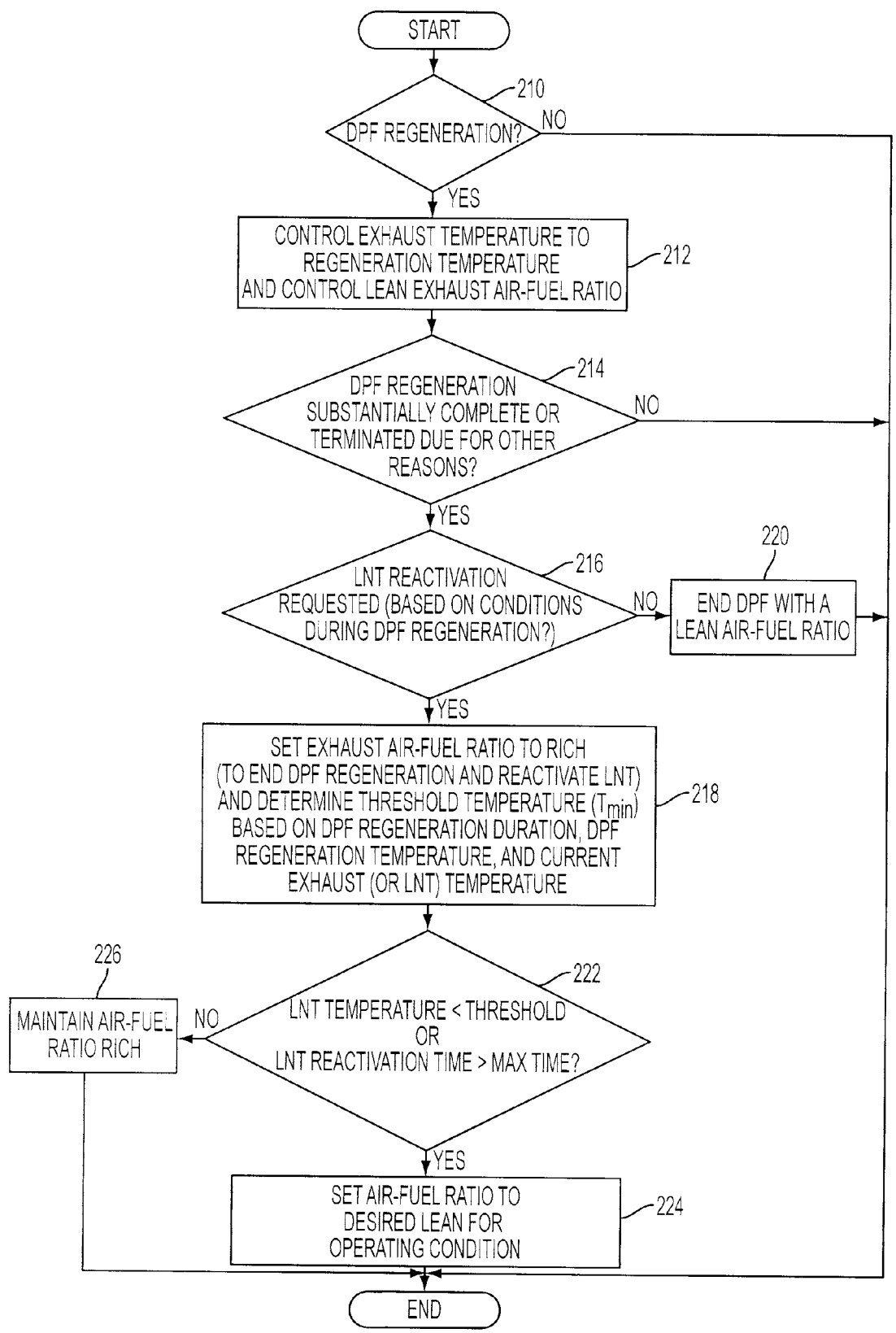
FIG. 2 shows an example high level flow chart of example operation.

Referring now to FIG. 2, an example control routine is provided for controlling emission control operation during and after DPF regeneration. In 210, the routine first determines whether a DPF regeneration is requested. For example, a DPF regeneration may be requested after traveling a certain number of miles, when a predetermined amount of stored particulate is reached, when differential pressure across the DPF rises to a threshold, and/or various others. If so, the routine continues to 212 to control exhaust temperature to a regeneration temperature and control a lean exhaust air-fuel ratio. For example, exhaust temperature may be raised using various approaches, such as by throttling, adjusting valve timing, adjusting air-fuel ratio to be less lean, externally loading the engine (e.g., by engaging clutches/etc.,), by charging a battery such as in a hybrid vehicle, increasing an exhaust gas recirculation rate, changing combustion and/or injection timing, operating with additional late injections or exhaust gas injections, and/or various others. In one example, an oxidation catalyst may be employed upstream of the DPF to ensure that the fuel and air combust prior to contacting the diesel particulate filter. The exhaust temperature may be raised to at least a regeneration temperature, at which particulate stored on the DPF may burn off so that the device may be regenerated. Further, the lean air-fuel ratio used during this high temperature regeneration may be adjusted to limit the temperature, e.g., by limiting excess oxygen available for reaction with the stored particulate.

Note that even if exhaust temperature is accurately controlled, the high temperature condition in combination with a lean exhaust gas composition may degrade activity of other emission control devices, such as the LNT. Additional details describing example degradation that may occur is described in further detail below herein with regard to FIGS. 4-6.

Continuing with FIG. 2, in 214 the routine determines whether DPF regeneration is substantially complete, or terminated for other reasons. For example, the regeneration may be determined to be substantially complete when an amount of particulate remaining in the DPF is below a threshold, low, amount. Alternatively, the regeneration may be determined to be substantially complete after the regeneration has continued for a predetermined amount of time, or when a differential pressure across the DPF has dropped below a threshold value. In addition, there may be other reasons for termination of DPF regeneration. For example, the DPF regeneration may be interrupted by an operating condition that prohibits completion of regeneration, or even by a request for an engine shut-down, and an anticipation that such a request may be imminent.

If so, the routine continues to 216 to determine whether LNT reactivation (which may include rich operation until the LNT temperature falls below a threshold value) is requested to follow the DPF regeneration. For example, depending on the duration of DPF regeneration, temperature of DPF regeneration, engine operating conditions, etc., LNT reactivation may be requested, or not. In another example, a method of estimating the degree of oxidation of catalysts in the LNT may be used, where the model may include a kinetic model or other similar model. Further, combinations of engine mapping data and dynamic models may be used to determine whether LNT reactivation following DPF regeneration is requested, and also may be used to control such operation. In the example, where LNT reactivation depends on the temperature and time required for DPF regeneration, it is possible to better match the deactivation of the LNT catalyst (which may increase with both DPF regeneration time and temperature) to the actual conditions that were present during the previous DPF regeneration. For example, with increased deactivation, longer rich operation and/or more rich operation, may be used during the cool-down (or even a longer cool-down may be provided).

If the answer to 216 is No, the routine continues to 220 to end the DPF regeneration (e.g., by reducing temperature and/or limiting excess oxygen) and maintain and/or continue operation with a lean air-fuel ratio. Otherwise, the routine continues to 218 to set the exhaust air-fuel ratio to a rich value and end the DPF regeneration. Further, the routine may determine a lower temperature threshold (Tmin). The rich air-fuel ratio and temperature threshold may be based on various factors, such as the DPF regeneration duration, the DPF regeneration temperature, the current exhaust (or LNT) temperature, and engine operating conditions, for example. Also, in one example, the rich operation for LNT reactivation may be continuously rich, or may be alternating rich/lean in order to decrease HC and CO emissions while reactivating the catalyst. Such operation may be possible due to the oxidation kinetics being slower than the reduction kinetics. Further, rich operation (or alternating) may continue during the LNT cool down to avoid re-oxidizing the catalytic materials in the LNT. Further, in the event of engine shut down, fuel or other reductant can be injected in the exhaust to create a reducing atmosphere during catalyst cool down even when the engine is not operating.

Alternatively, another embodiment for determining whether to utilize LNT reactivation following high temperature/lean operation may use assessments of the performance of the LNT catalyst following such operation. For example, the LNT reactivation may be requested based on a NOx sensor that is used to infer the activity of the LNT catalyst. In such a case, if the catalyst is judged to be deactivated sufficiently, the LNT reactivation is requested. Further, in still another alternative embodiment, LNT reactivation may be requested independent of DPF regeneration.

Continuing with FIG. 2, from 218 the routine continues to 222 to determine whether the LNT temperature is less than the threshold (Tmin) or whether the LNT reactivation time has reached a maximum allowed time. In this way, it is possible to maintain at least some rich operation during the cool-down of the LNT from the high-temperatures characteristic of DPF regeneration to the normal engine operating temperatures.

If the answer to 222 is yes, the routine continues to 224 to set the air-fuel ratio to a desired lean air-fuel ratio based on engine operating conditions, such as the driver demand. Otherwise, the routine continues to 226 to continue the LNT reactivation. In one example, the LNT reactivation operation may continue until the catalyst is sufficiently reduced using the kinetic model noted above, where the rich operation is triggered by exiting from high temperature lean operation. Further, control of the level of rich operation and duration of rich operation following exit from high temperature/lean conditions may also be based on engine mapping data. Such data may be based on experiments defining the minimum time/temperature conditions required to sufficiently reactivate the LNT catalyst. For example, a 2-minute/700° C. rich condition described in the example data below may be as effective in restoring LNT catalyst activity as treatments carried out for longer times (e.g., 30 minutes).

As noted above, the rich LNT reactivation operation may be based on various parameters such as the conditions of the immediately preceding DPF regeneration, and such conditions may be such that no LNT reactivation is used. In other words, one embodiment of the approach herein employs the LNT regeneration only as needed to ensure that the LNT catalyst is returned to a sufficiently active state following DPF regeneration. Various reasons may exist for reducing use of the LNT reactivation, such as 1) reducing the fuel penalty associated with high-temperature rich operation, 2) reducing the re-loading of the DPF that may begin once the exhaust air-fuel ratio is switched to rich conditions, and 3) reducing the breakthrough of CO and HC that may occur under rich operating conditions.

Finally, it should be noted that the high-temperature rich operation following DPF regeneration may also remove adsorbed sulfur from the LNT catalyst, and thus this removal may be accounted for in any sulfur estimating routines that are then used to schedule a desulfurization. Further, the LNT regeneration described above herein aimed at reactivation catalyst activity degraded by high temperature lean operation may also be adjusted to further enhance sulfur removal, although such effects may be a secondary effect.

Figure 3:
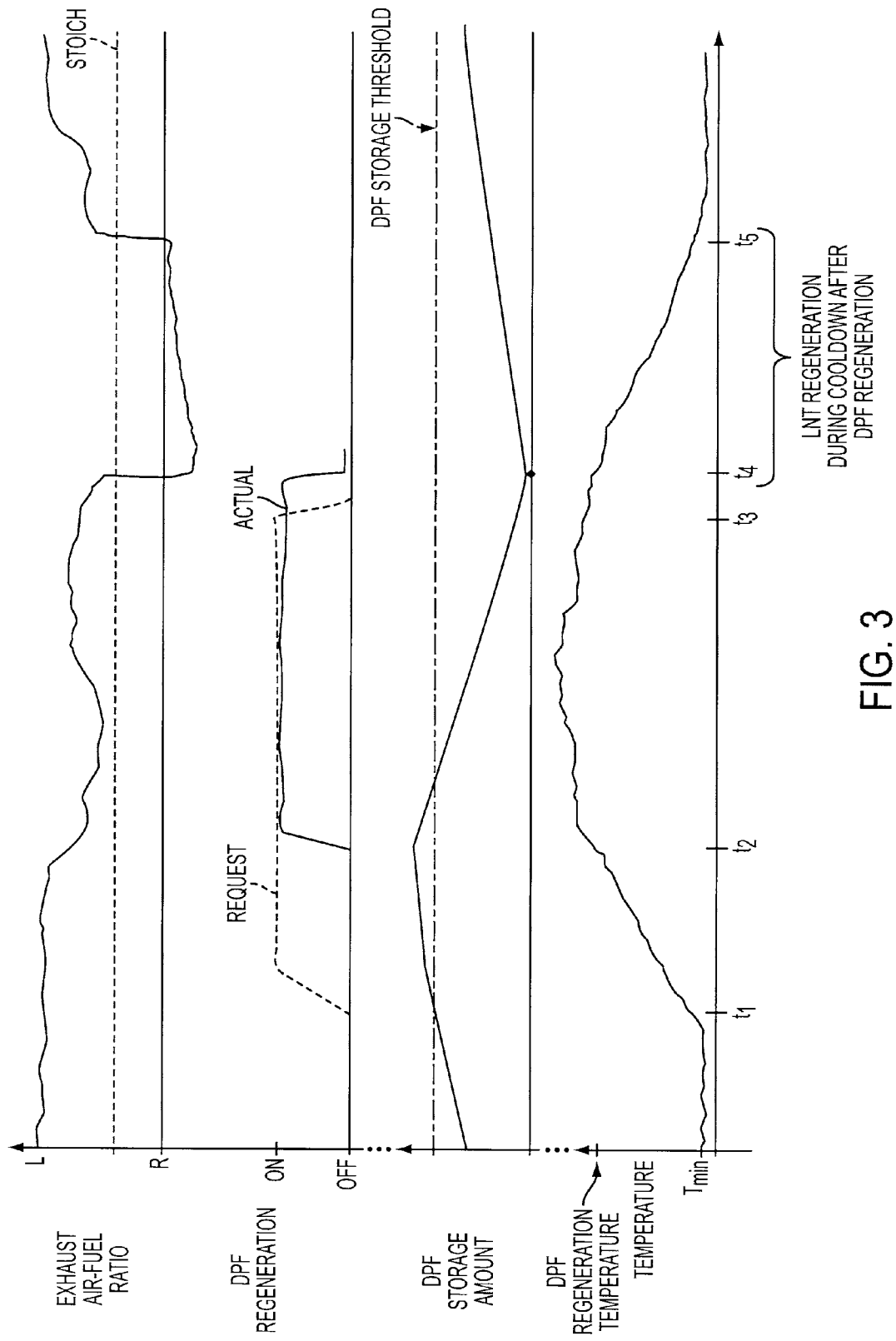
FIG. 3 shows example operation performance.

Referring now to FIG. 3, a prophetic example of operation according to the routine of FIG. 2 is described. Specifically, FIG. 3 shows four graphs, the top graph showing exhaust air-fuel ratio, the next showing DPF regeneration state, the next showing DPF storage level, and the bottom showing exhaust temperature, which in this case shows LNT temperature.

FIG. 3 shows initially normal engine operation, in which particulate is being stored during lean operation, which continues to t1. At t1, a sufficiently high level of particulate storage is reached (the short-dash long-dash line), and a DPF regeneration is requested as shown by the dotted line in the second graph. At this point, the engine operation is adjusted to increase exhaust gas temperature as shown by the bottom graph. At t2, a sufficient temperature is reached and DPF regeneration is active, thereby removing stored particulate during high temperature, lean conditions (where the lean air-fuel ratio may be adjusted, along with throttle position, valve timing, reductant injection) to limit the available excess oxygen in the exhaust and thereby control regeneration temperature. The regeneration continues until t3, at which point sufficient particulate removal is reached, and the DPF operation is requested to be inactive. Then, as the exhaust temperature begins to fall below the DPF regeneration temperature, the exhaust air-fuel ratio is changed to rich at t4 and continued until LNT temperature reaches the threshold Tmin at t5. Further, during the cool-down operation between t4 and t5, the rich air-fuel ratio may be adjusted based on the temperature and/or duration of the DPF regeneration between t2 and t3.

While this shows just one example operation, various alternatives are possible as noted herein.

Note that the control routines included herein can be used with various engine configurations, such as those described above. The specific routine described herein may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions or functions may be repeatedly performed depending on the particular strategy being used. Further, the described steps may graphically represent code to be programmed into the computer readable storage medium in controller 12.

Figure 4:
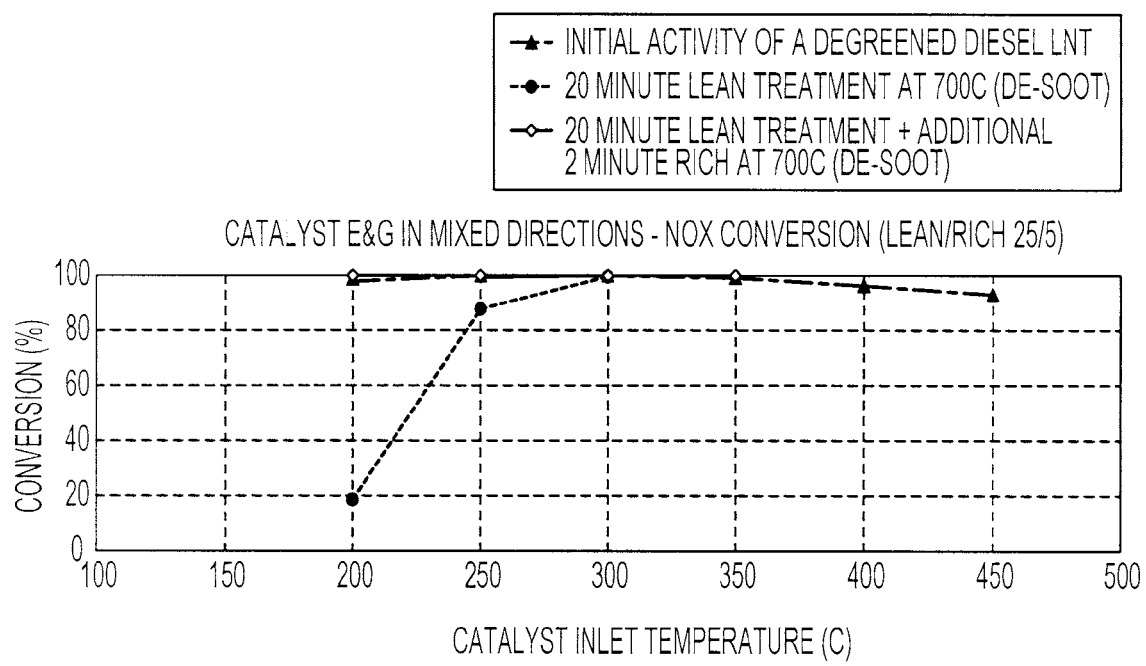
FIGS. 4-6 show various example test/simulation data.
Figure 5:
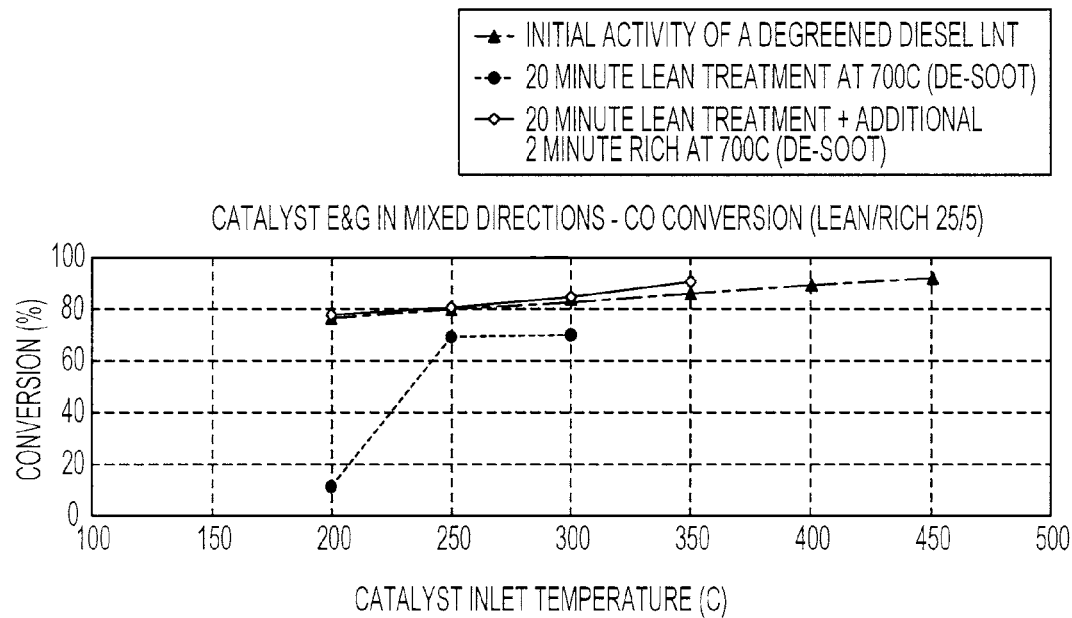
Figure 6:
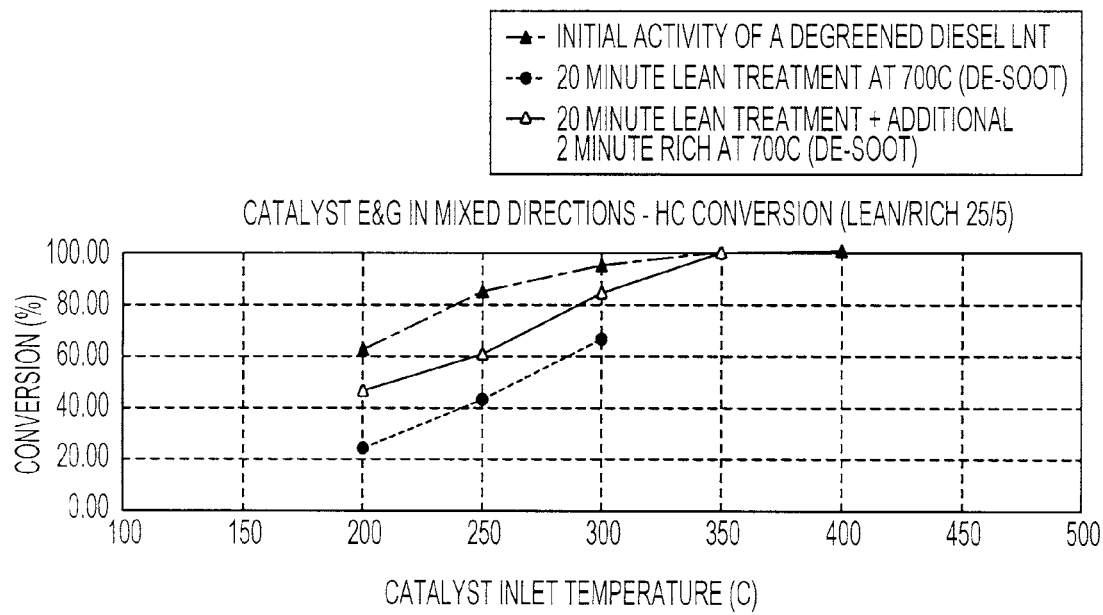

Referring now to FIGS. 4-6, additional experimental results are described illustrating data which may be used to support the notions included above. Specifically, FIG. 4 shows the average NOx conversion as a function of exhaust gas temperature over a sample of LNT catalyst during alternating storage (25 s lean) and release (5 s rich) modes of exhaust gas perturbation. These data represent a laboratory simulation of the type of operation that a LNT would be subjected to on a vehicle. The specific duty cycle of lean and rich exposure, as well as the feedgas composition might differ somewhat in actual vehicle applications, but the conditions chosen here are generally representative of diesel vehicles. Three different NOx conversion vs. temperature profiles are shown, reflecting the NOx activity after three different treatment conditions prior to the activity evaluation. The top curve (triangles) represents the initial activity of the catalyst obtained after a de-greening treatment (where de-greening includes conditioning and stabilizing a catalyst prior to its use on the vehicle). As shown by FIG. 4, the de-greening process places the catalyst in a highly active state for NOx control. Subsequent to de-greening, if the LNT catalyst is subjected to a 20 minute lean treatment at 700° C. (typical of a DPF regeneration protocol, i.e., de-sooting operation), it now has substantially reduced NOx conversion activity when evaluated at temperatures below 300° C. As diesel vehicles operate for a significant duration under conditions where exhaust gas temperatures at the LNT are less than 300° C., such deactivation may be significant to emission control. The third case investigated is that using the approaches described herein, and is shown by the diamond symbols in FIG. 3. Here, the LNT catalyst was exposed to the same lean treatment characteristic of de-sooting operation as noted above, but the lean treatment was followed by 2 minutes of rich operation while maintaining the exhaust gas temperature at 700° C. As shown, the 2-minute rich treatment restores the LNT catalyst to its original high-activity state for NOx control.

FIG. 5 shows the CO conversion as a function of temperature following the same series of pre-treatments as shown in FIG. 3. The same trend is observed as for NOx. In the case of CO, however, even at 300° C. and above, the LNT catalyst after the lean treatment has decreased activity compared to both the initial de-greened catalyst and the restored catalyst. But, note that restoration of catalyst activity is complete when the catalyst is subjected to the 2-minute rich treatment at 700° C. following the 20-minute lean de-sooting type treatment.

Similar to NOx and CO, HC conversion is suppressed after the 20 minute lean treatment at 700° C. as shown in FIG. 6. The suppressed activity is maintained up to the highest evaluation temperature examined (300° C.). Applying the 2 minute rich treatment following the 20 minute lean treatment restores the HC conversion only part way to the de-greened state at evaluation temperatures below 350° C. This may be explained due to the differing roles of Pt and Rh in the LNT catalyst formulation. Rh can be most effective in converting CO and NOx; Pt can be more effective for HC. The partial restoration observed in the case of HC suggests that both the Rh and Pt functions may be adversely affected by the 700° C. de-sooting operation, and only the Rh function is fully restored following the subsequent 2-minute rich regeneration. Nevertheless, improved operation is still achieved.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and nonobvious combinations and subcombinations of the various systems and configurations, and other features, functions, and/or properties disclosed herein. Further, while various theories may have been set forth herein (such as regarding the theory that high temperature exposure to lean exhaust gas air-fuel ratio conditions deactivates various materials in the catalyst including the platinum group metals and possibly others such as rare earth oxide materials used in oxygen storage materials, dispersing agents for the platinum group metals, and supporting materials for the platinum group metals), the approaches and systems set forth herein do not necessarily rely on the correctness of such theories. Also, high temperature lean exposure of a LNT for extended time may occur in other situations other than DPF regenerations, such as when operating near peak torque at high speeds.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a system having an engine with an emission control system, the emission control system including a lean NOx trap and a particulate filter, the method comprising:
   after lean exhaust gas air-fuel ratio regeneration of the particulate filter at an elevated regeneration temperature, providing a rich or intermittently rich exhaust air-fuel ratio for a duration lasting until LNT temperature falls to a minimum threshold, where said rich or intermittently rich operation reactivates catalytic materials in the LNT and reverses deactivation caused by the elevated temperature lean operation associated with previous particulate filter regeneration.

2. The method of claim 1 where the rich or intermittently rich operation is provided in response to an engine shut-down during DPF regeneration.

3. The method of claim 1 further comprising regenerating the particulate filter by increasing exhaust gas temperature above a regeneration temperature.

4. The method of claim 1 further comprising ending the particulate filter regeneration by reducing exhaust gas temperature below a regeneration temperature.

5. The method of claim 1 where the catalytic material reactivated includes one or more of platinum group metals and one or more rare earth oxides.

6. The method of claim 1 where the particulate filter is coupled downstream of the lean NOx trap, the method further comprising routing exhaust gases from the lean NOx trap to the particulate filter.

7. The method of claim 6 where said rich or intermittently rich air-fuel ratio is adjusted based on particulate filter regeneration temperature.

8. The method of claim 6 where said rich or intermittently rich air-fuel ratio is adjusted based on a duration of particulate filter regeneration.

9. The method of claim 8 wherein the minimum threshold temperature is adjusted based on particulate filter regeneration temperature.

10. The method of claim 8 wherein the minimum threshold temperature is adjusted based on a duration of particulate filter regeneration.

11. A method for operating a system having an engine with an emission control system, the emission control system including a lean NOx trap and a particulate filter, the method comprising:

during a first operating mode, after lean exhaust gas air-fuel ratio regeneration of the particulate filter at an elevated regeneration temperature, providing a rich or intermittently rich exhaust air-fuel ratio for a duration lasting until LNT temperature falls to a minimum threshold, where said rich or intermittently rich operation reactivates catalytic materials in the LNT and reverses deactivation caused by the elevated temperature lean operation associated with previous particulate filter regeneration; and during a second operating mode, after lean exhaust gas air-fuel ratio regeneration of the particulate filter at said elevated regeneration temperature, continuing lean operation based on operating conditions.

12. The method of claim 11 where the rich or intermittently rich operation is provided in response to an engine shut-down during DPF regeneration.

13. The method of claim 11 where the particulate filter is coupled downstream of the lean NOx trap, the method further comprising routing exhaust gases from the lean NOx trap to the particulate filter, and where selection between the first and second operating mode is based on temperature reached during the particulate filter regeneration and a duration of the particulate filter regeneration.

14. The method of claim 13 where said rich or intermittently rich air-fuel ratio is adjusted based on particulate filter regeneration temperature.

15. The method of claim 14 where said rich or intermittently rich air-fuel ratio is adjusted based on a duration of particulate filter regeneration.

16. The method of claim 15 wherein the minimum threshold temperature is adjusted based on particulate filter regeneration temperature.

17. The method of claim 16 wherein the minimum threshold temperature is adjusted based on a duration of particulate filter regeneration.

18. The method of claim 17 further comprising regenerating the particulate filter by increasing exhaust gas temperature above a regeneration temperature.

19. The method of claim 18 further comprising ending the particulate filter regeneration by reducing exhaust gas temperature below a regeneration temperature.

20. A system having an engine with an emission control system, comprising:

a lean NOx trap;

a particulate filter coupled downstream of the lean NOx trap, a control system for controlling the engine operation, wherein:

during a first operating mode, after lean exhaust gas air-fuel ratio regeneration of the particulate filter at an elevated regeneration temperature, providing a rich or intermittently rich exhaust air-fuel ratio for a duration lasting until LNT temperature falls to a minimum threshold, where said rich or intermittently rich operation reactivates catalytic materials in the LNT and reverses deactivation caused by the elevated temperature lean operation associated with previous particulate filter regeneration;

during a second operating mode, after lean exhaust gas air-fuel ratio regeneration of the particulate filter at said elevated regeneration temperature, continuing lean operation based on operating conditions; and selecting between the first and second operating mode based on temperature reached during the particulate filter regeneration and a duration of the particulate filter regeneration.

* * * * *